Dec. 5, 1939. D. ECKLEBERRY 2,181,878
CLOTHESLINE AND PULLEY
Filed Jan. 10, 1938 2 Sheets-Sheet 1
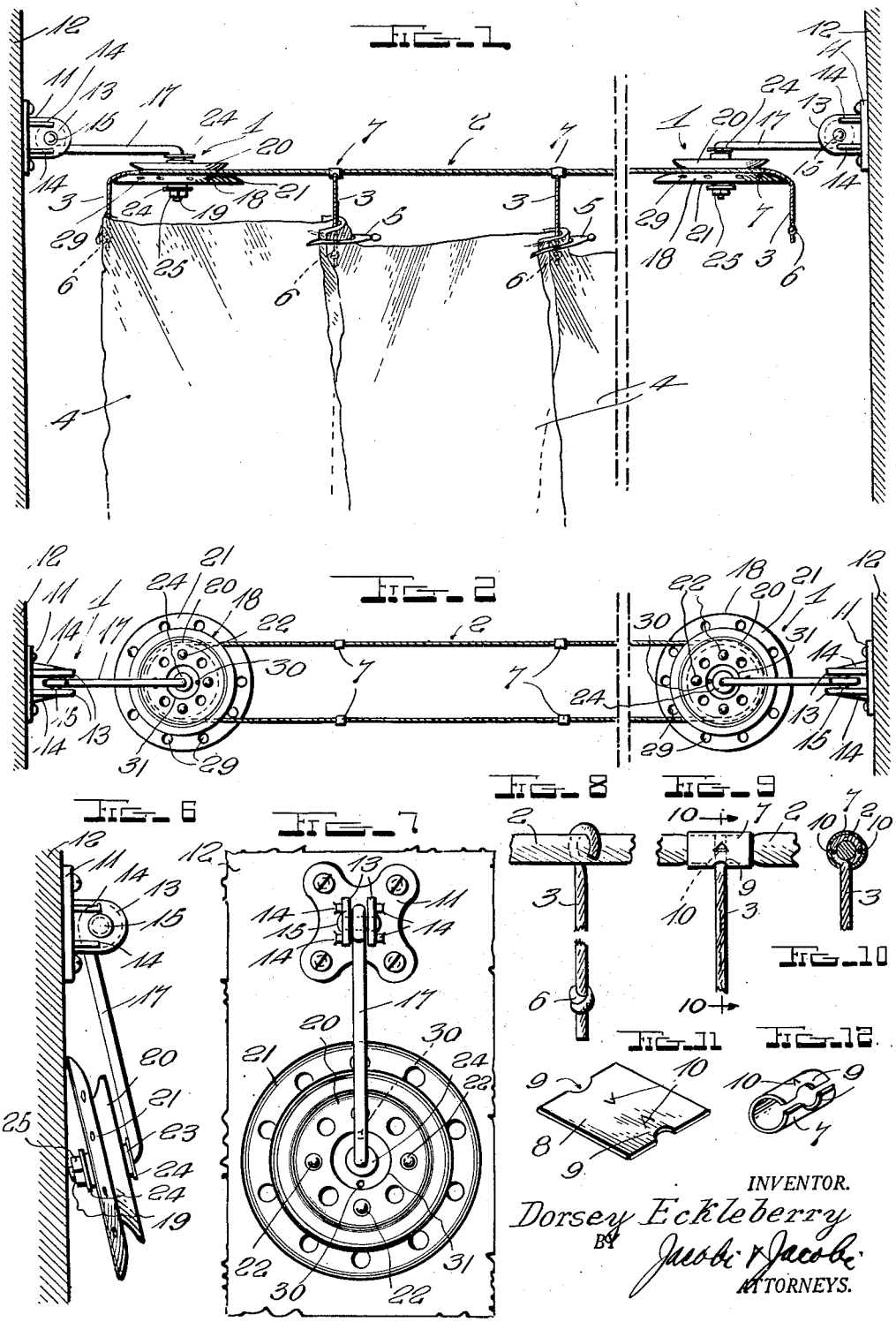
INVENTOR.
Dorsey Eckleberry
BY Jacob & Jacob
ATTORNEYS.

Dec. 5, 1939.　　　D. ECKLEBERRY　　　2,181,878
CLOTHESLINE AND PULLEY
Filed Jan. 10, 1938　　　2 Sheets-Sheet 2
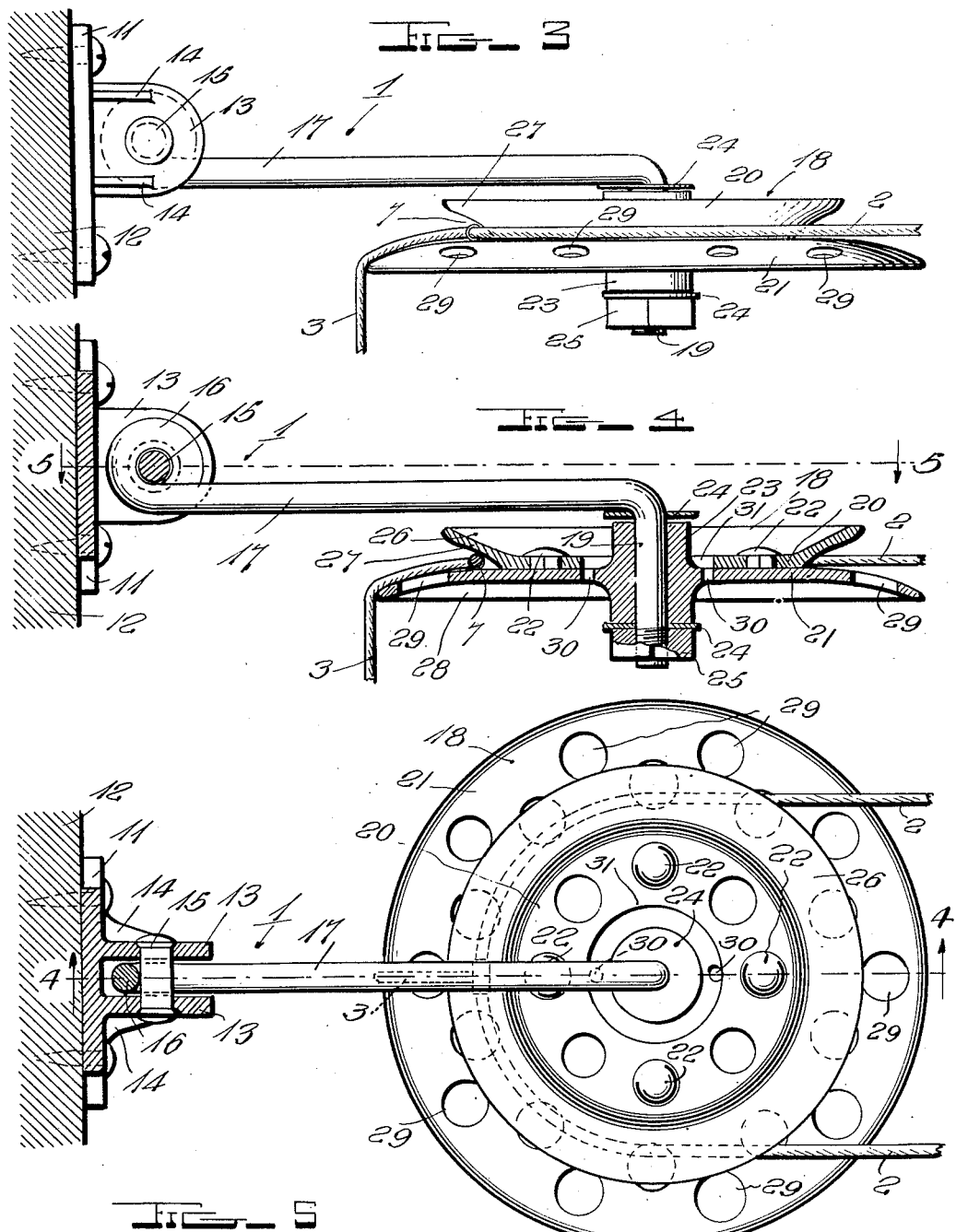
INVENTOR.
Dorsey Eckleberry,
BY
ATTORNEYS.

Patented Dec. 5, 1939

2,181,878

UNITED STATES PATENT OFFICE 2,181,878

CLOTHESLINE AND PULLEY

Dorsey Eckleberry, Hawley, Pa.

Application January 10, 1938, Serial No. 184,312

2 Claims. (Cl. 74—230.8)

This invention relates to an improved clothesline and pulleys therefor and it is one object of the invention to provide a clothesline having an improved line construction and also improved pulleys mounted in an improved manner, the line being an endless line trained about the pulleys and carrying depending members to which clothes are to be secured and the pulleys being of such formation that the line may pass about the pulleys even when both flights of the line are loaded with clothes.

Another object of the invention is to so mount the pulleys that the shanks or arms carrying the sheaves or wheels may have swinging movement in a vertical plane and thus maintain a position in close parallel relation to adjoining portions of the line and thus prevent weight of the line or clothes suspended therefore from causing the line to accidentally slip out of engagement with the pulley wheels.

Another object of the invention is to provide pulley wheels, each of which consists of companion disks or sections firmly secured to each other and having marginal portions defining flanges which retain the line in engagement with the pulleys and are so shaped in cross section that a wedging grip will be exerted upon the line to prevent the line from moving about the pulley wheels without turning them. It will thus be seen that wear upon the line will be prevented.

Another object of the invention is to provide each pulley with one section or disk of such size or diameter that it projects radially beyond the other disk an appreciable extent sufficient to eliminate any possibility of the line slipping off the pulleys, the transverse outline of the marginal flange portion of the large lower disk being such that, during rotation of the pulleys as the line is moved, wear upon the line by contact with the marginal edge of the lower disk cannot occur.

Another object of the invention is to provide the line with depending hanger members so connected with the line that they will at all times remain in a pendent position and pass easily about the pulley wheels without catching, the hangers being firmly secured by fastener clips so constructed that the hangers may be firmly secured the proper distance from each other longitudinally of the line and new hangers applied to the line when necessary.

Still another object of the invention resides in providing a device which is simple and durable in construction, inexpensive to manufacture and one which will be very efficient in operation and application to use.

With these and numerous other objects in view, my invention consists in the novel features of construction, combination and arrangement of parts as will be hereinafter referred to and more particularly pointed out in the specification and claims.

The invention is illustrated in the accompanying drawings wherein:

Figure 1 is a side elevation showing clothes hung from a clothesline of the improved construction;

Figure 2 is a top plan view of the improved clothesline;

Figure 3 is a side elevation upon an enlarged scale of one of the pulleys;

Figure 4 is a sectional view taken longitudinally through the pulley along the line 4—4 of Figure 5;

Figure 5 is a view taken along the line 5—5 of Figure 4 looking down upon the pulley;

Figure 6 is a side elevation showing one of the pulleys disengaged from the line and swung downwardly from its mounting bracket;

Figure 7 is a front elevation of Figure 6;

Figure 8 is a fragmentary view showing a hanger engaged about the line before the securing clip is applied;

Figure 9 is a view similar to Figure 8 showing the clip applied;

Figure 10 is a sectional view taken along the line 10—10 of Figure 9;

Figure 11 is a perspective view of the sheet metal blank from which the securing clip is formed; and Figure 12 is a perspective view of a clip before being secured about the line.

The improved clothesline constituting the subject matter of this invention consists briefly of a pair of pulleys 1 and an endless line 2 which is trained about the pulleys and carries a plurality of hangers 3 to which the clothes 4 are attached by clothes pins 5 of a conventional formation. A knot 6 is formed near the lower end of each of the hangers which are formed of cut sections of rope similar to that of the line 2, the knots being provided so that the weight of sheets and other articles cannot cause them to slip down along the hangers and the hangers pass upwardly between arms or prongs of the clothes pins. Therefore, danger of the clothes slipping out of engagement with the hangers will be eliminated and the clothes cannot drop upon the ground and become soiled after having been hung from the clothes line. Since the clothes are suspended from hangers carried by both flights of the clothesline, clothes hung from one flight will strike clothes hung from the other flight if blown by wind and a stop thus provided which will prevent the clothes from being wound about the clothesline by wind. Therefore, the clothes will always hang properly from the clothesline and dry quickly.

While upper ends of the hangers 3 may be woven into the clothesline 2 they are preferably applied as shown in Figures 8, 9 and 10. Referring to these figures, it will be seen that each hanger consists of a length of rope which has its upper end portion folded about the clothesline and secured through the medium of a metal clip 7. The clip is formed from a sheet metal plate 8 which is rolled to assume a tubular form as shown in Figure 12 and has its confronting marginal edges recessed as shown at 9 to provide a passage through which the hanger rope extends when the clip is crimped tightly about the clothesline. Tongues 10 are struck from the blank forming the split tubular clip and project inwardly as shown in Figure 11 so that as the clip is tightened about the clothesline the prongs or spurs formed by these tongues will be embedded in the portion of the hanger rope wrapped about the clothesline as shown in Figure 10 and firmly hold the hanger against disengagement as well as preventing the clip from moving out of its proper position upon the clothesline. It will thus be seen that the hangers will be prevented from becoming detached from the clothesline by weight of sheets and other heavy articles and in addition the hangers will be prevented from shifting longitudinally of the clothesline out of their proper positions thereon in spaced relation to each other.

The pulleys are of a duplicate construction and each has an attaching bracket 11 which is secured against a post or other convenient support 12. Ears 13 which are braced by webs 14 carry a pin 15 which passes through an eye 16 at the inner end of an arm 17 formed of strong metal rod and since the bracket is mounted in a position to dispose the pin 15 horizontally, the arm will be mounted for vertical swinging movement. It will thus be seen that the arms may have swinging movement from the horizontal position shown in Figure 1 towards the depending position shown in Figure 6 if the clothesline is caused to sag by weight of clothes attached to the hangers, the portions of the clothesline which are engaged about the sheaves or pulley wheels 18 will at all times extend substantially parallel to the arms 17 and be prevented from slipping out of engagement with the pulley wheels which are rotatably mounted about stems 19 formed by outer end portions of the arms which are bent downwardly at right angles to the arms as shown in Figure 3.

The sheave or pulley wheel of each pulley consists of companion disks 20 and 21 formed of strong metal and disposed in contacting engagement with each other where they are secured by rivets 22 as shown in Figure 4. A hub 23 is formed integral with the lower disk 21 and fits snugly about the stem 19 between abutment collars or disks 24 applied to the stem above and below the pulley wheel. It will thus be seen that while the pulley wheel may turn freely about the stem it will be prevented from slipping along the stem and making undesirable contact with the arm 17. The upper collar is welded to the stem and the lower collar is engaged by a securing nut 25 threaded upon the lower end of the stem. The upper disk has its marginal portion flared upwardly to form a flange 26 having a concaved under surface 27 which overhangs the flat portion of the lower portion of the lower disk as shown in Figure 4 and referring to this figure and Figure 3, it will be seen that the lower disk has its marginal portion curved downwardly to provide a flange 28 gradually merging into the upper surface of the lower disk. In view of the fact that the lower disk is of appreciably greater diameter than the upper disk, it projects quite a distance beyond the periphery of the upper disk as shown in Figure 5. Therefore, when the clothesline is engaged about the pulleys, the portions resting upon the lower disks of the pulley wheels will be prevented from slipping downwardly out of engagement with the lower disks and dropping upon the ground with resulting soiling of clothes suspended from the hangers. The fact that the flange of the lower disk is curved and merges into the upper face of the disk eliminates sharp edges and the clothesline will not be worn by engagement with sharp edges as the clothesline is manipulated and moved about the pulleys. It should also be noted that due to the angular relation of the flange of the upper disk to the portion of the lower disk overhung thereby, the clothesline will have wedging fit between the disks and when pull is exerted upon one flight of the clothes line to move it about the pulleys, a firm grip will be established between the rope and the flanges of the sheaves and turning movement imparted to the pulley wheels or sheaves. Therefore, sliding of the rope about the pulley wheels will be eliminated and wear of the rope prevented. Openings 29 are formed in the flange of the lower disk so that water will be prevented from accumulating thereon and adjacent the hub are formed other drain openings 30 for escape of water which flows from the upper disk through the open central portion 31 thereof. The provision of the openings 30 and 31 prevents water and snow from accumulating upon the pulleys and freezing so that turning of the pulley wheels will be interferred with or entirely stopped.

From the foregoing description of the construction of my improved device, the operation thereof and the method of applying the same to use will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, without departing from the spirit or sacrificing any of the principles of the invention.

Having thus described the invention, what is claimed is:

1. In a clothesline support, a pulley wheel comprising a hub bored axially to receive a mounting stem, a lower main disc rigid with said hub and surrounding the hub intermediate the length thereof, and an upper auxiliary disc rigidly secured upon the upper face of the main disc about the hub, said main disc being formed with a shallow marginal lip curved downwardly radially thereof away from the auxiliary disc and merging into the upper face of the main disc, and said auxiliary disc being formed with a circumferential marginal flange extending upwardly away from the main disc at an outward incline radially of the auxiliary disc at an abrupt angle to the under face of the auxiliary disc and having its under surface intersecting the main disc at an obtuse angle thereto whereby the lip and the flange cooperate with each other to form the pulley with a circumferentially extending rope-receiving groove substantially V-shaped in cross section to provide walls converging inwardly for gripping a rope.

2. In a clothesline support, a pulley wheel adapted to be rotatably mounted and being provided with a circumferentially extending marginal groove for receiving a rope, said groove being V-shaped in cross section to provide companion walls for gripping a rope between them, one wall being curved transversely along a continuous shallow arc from its outer edge to its intersection with the inner edge of the other side wall of the groove, and the second wall of the groove being disposed at an acute angle to the first wall and formed with a concaved inner surface.

DORSEY ECKLEBERRY.